United States Patent
Nakajima (10) Patent No.: US 8,355,633 B2
(45) Date of Patent: Jan. 15, 2013

(54) COMMUNICATION NETWORK MANAGEMENT SYSTEM, WAVELENGTH-DIVISION MULTIPLEX APPARATUS, COMMUNICATION MANAGEMENT APPARATUS, COMMUNICATION NETWORK MANAGEMENT METHOD AND COMMUNICATION NETWORK MANAGEMENT PROGRAM

(75) Inventor: Rie Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 539 days.

(21) Appl. No.: 12/624,201

(22) Filed: Nov. 23, 2009

(65) Prior Publication Data

US 2010/0142957 A1 Jun. 10, 2010

(30) Foreign Application Priority Data

Dec. 10, 2008 (JP) ................. 2008-314804

(51) Int. Cl.
*H04J 14/00* (2006.01)
(52) U.S. Cl. .......................................... 398/57
(58) Field of Classification Search .................. 398/57
See application file for complete search history.

(56) References Cited

U.S. PATENT DOCUMENTS 7,280,756 B2 * 10/2007 Takeshita ..................... 398/57
7,529,480 B2 * 5/2009 Seddigh et al. ............... 398/14
2003/0118272 A1 6/2003 Tsushima et al.
2004/0190900 A1 * 9/2004 Yagyu ........................... 398/57
2008/0151755 A1 6/2008 Nishioka

FOREIGN PATENT DOCUMENTS

| JP | 2003189341 A | 7/2003 |
| JP | 2003234771 A | 8/2003 |
| JP | 2003235061 A | 8/2003 |
| JP | 2005167840 A | 6/2005 |
| JP | 2008160385 A | 7/2008 |
| JP | 2008206028 A | 9/2008 |

OTHER PUBLICATIONS

Japanese Office Action for JP2008-314804 mailed on Oct. 23, 2012.

* cited by examiner

*Primary Examiner* — Danny Leung (57) ABSTRACT

A communication network management system including a node apparatus 10 provided with a wavelength detecting part 110 which detects the wavelength of an optical wave transmitted through a path, a destination node detecting part which detects a node apparatus connected to a transmission path, a connection information storage part 112 which stores connection information, a connection information sending part 113 which sends connection information to an NMS terminal, and a path setting part 114 which sets path based on path setting data received from the NMS terminal 20; and an NMS terminal provided with a connection information detecting part 220 which receives connection information from the node apparatus 10, a path setting data generating part 221 which generates path setting data of the node apparatus 10 based on the connection information and a path setting data sending part 222 which sends path setting data to the node apparatus 10.

13 Claims, 11 Drawing Sheets

Path connection information of the end-to-end path shown in FIG.1

| | Node identifier | 10a | 10b | 10c | 10d |
|---|---|---|---|---|---|
| Management information in node apparatus | Wavelength number (output) | λ1 | λ1 | λ2 | — |
| | Wavelength number (input) | — | λ1 | λ1 | λ2 |
| | Apparatus connection information | — | Connected to 10c | Connected to 10b | — |

Path connection information of the end-to-end path shown in FIG. 6

| Management information in node apparatus | Node identifier | 10e | 10f | | 10g |
|---|---|---|---|---|---|
| | | | 10f1 | 10f2 | |
| | Wavelength number (output) | λ3 | λ3 | λ4 | — |
| | Wavelength number (input) | — | λ3 | λ3 | λ4 |
| | Apparatus connection information | — | 10e side | 10g side | — |

FIG. 9

Path connection information of the end-to-end path shown in FIG. 8

| Node apparatus identifier | 10h | 10i | 10j |
|---|---|---|---|
| Management information in node apparatus | $\lambda 5$ | $\lambda 5$ | $\lambda 5$ |

Path connection information of the end-to-end path shown in FIG. 10

| | Node identifier | 10k | 10ℓ | 10m | 10n |
|---|---|---|---|---|---|
| Management information in node apparatus | Wavelength number | λ6 | λ6 | λ7 | λ7 |
| Information connection point information in the network management system | Wavelength number (light path information) | λ6 | λ6 | Input wavelength is λ6, the output wavelength is λ7 | λ7 |
| | End-to-end connection information | Path starting point | Connected to node 10m | Connected from node 10ℓ | Path end point |

COMMUNICATION NETWORK MANAGEMENT SYSTEM, WAVELENGTH-DIVISION MULTIPLEX APPARATUS, COMMUNICATION MANAGEMENT APPARATUS, COMMUNICATION NETWORK MANAGEMENT METHOD AND COMMUNICATION NETWORK MANAGEMENT PROGRAM

This application is based upon and claims the benefit of priority from Japanese patent application No. 2008-314804, filed on Dec. 10, 2008, the disclosure of which is incorporated herein in its entirety by reference.

TECHNICAL FIELD

The invention relates to a communication network management system, a wavelength-division multiplex apparatus, a communication management apparatus, a communication network management method and a communication network management program for performing path setting between nodes.

BACKGROUND ART

With an increase in the amount of information to be processed, there is an increasing demand for preparation or maintenance of communication infrastructure in order to conduct information communication smoothly.

In response to such a demand, in recent years, a communication network by wavelength division multiplex (Wavelength Division Multiplex, hereinafter referred to as "WDM") (Wavelength Division Multiplex Network, hereinafter referred to as "WDM network") which is suited to a large volume communication has come to be widespread.

In many cases, the WDM network plays a role as a network backbone such as a marine cable connecting continents. Therefore, if a fault occurs in the WDM network, effects brought by such fault are significantly extensive and serious.

In order to maintain the reliability of a WDM apparatus or a cable constituting the WDM network, maintenance and operation of the apparatus or the cable is of crucial importance.

In the WDM network, the so-called network management system (Network Management System, hereinafter referred to as "NMS") is incorporated for alarm monitoring or fault recovery, whereby extraction, analysis or the like of alarm information through a dedicated information processing terminal (hereinafter referred to as an "NMS terminal") become possible.

In addition, an NMS is provided with a data base of connection information relating to path setting (a wavelength and data relating to a destination node), and path setting or path changing can be performed unitarily by a remote operation from an NMS terminal.

As mentioned above, an NMS is a system which is indispensable for enhancing the reliability and convenience of the WDM network. Therefore, the operation of the WDM network largely depends on NMS, and the following troubles may occur.

Figure 8:
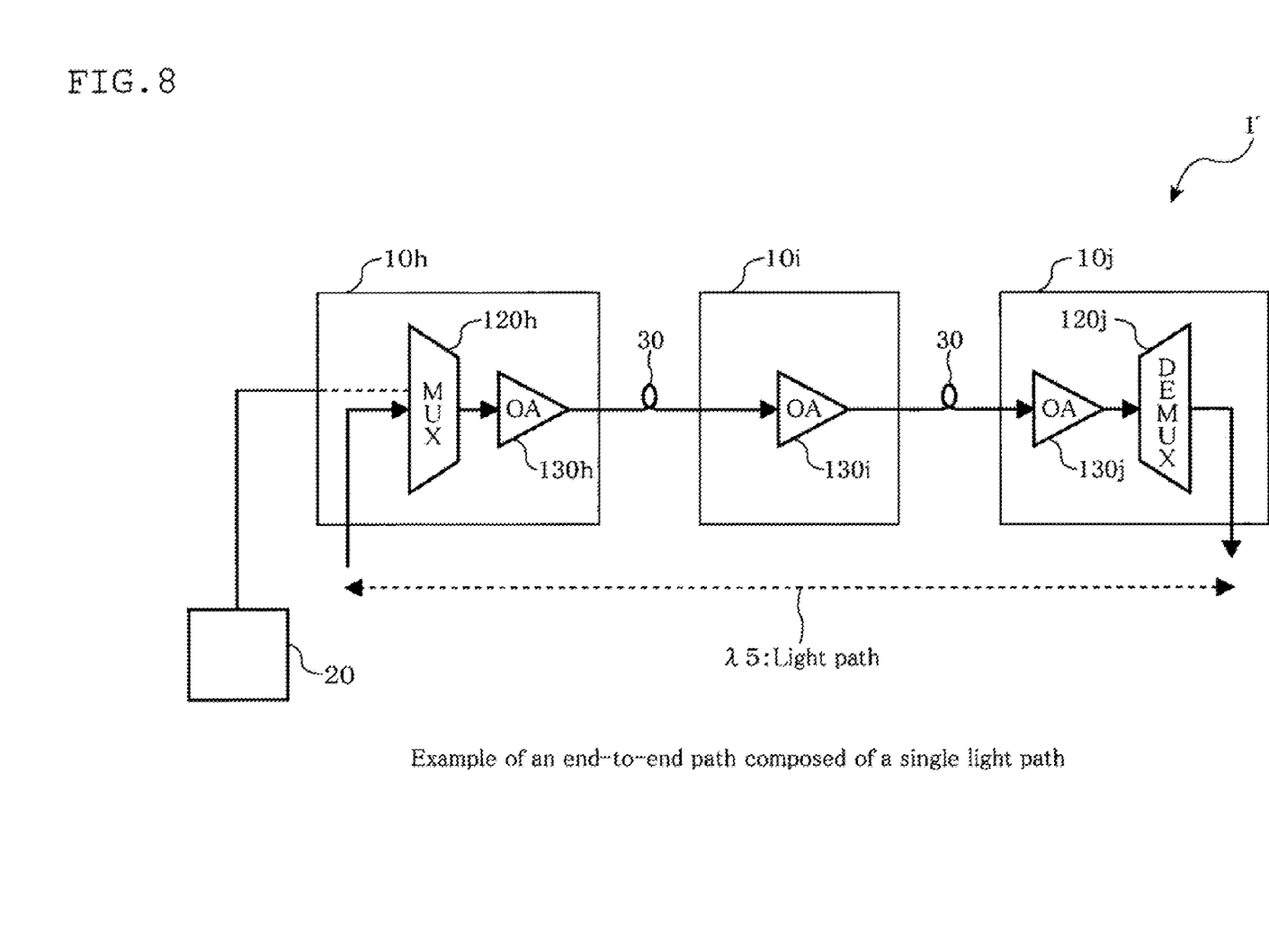
FIG. 8 is a network configuration diagram showing an example of an end-to-end path composed of a single light path.

FIG. 8 is a network configuration diagram showing an example of an end-to-end path composed of a single optical path in a WDM network having an NMS.

Figure 9:
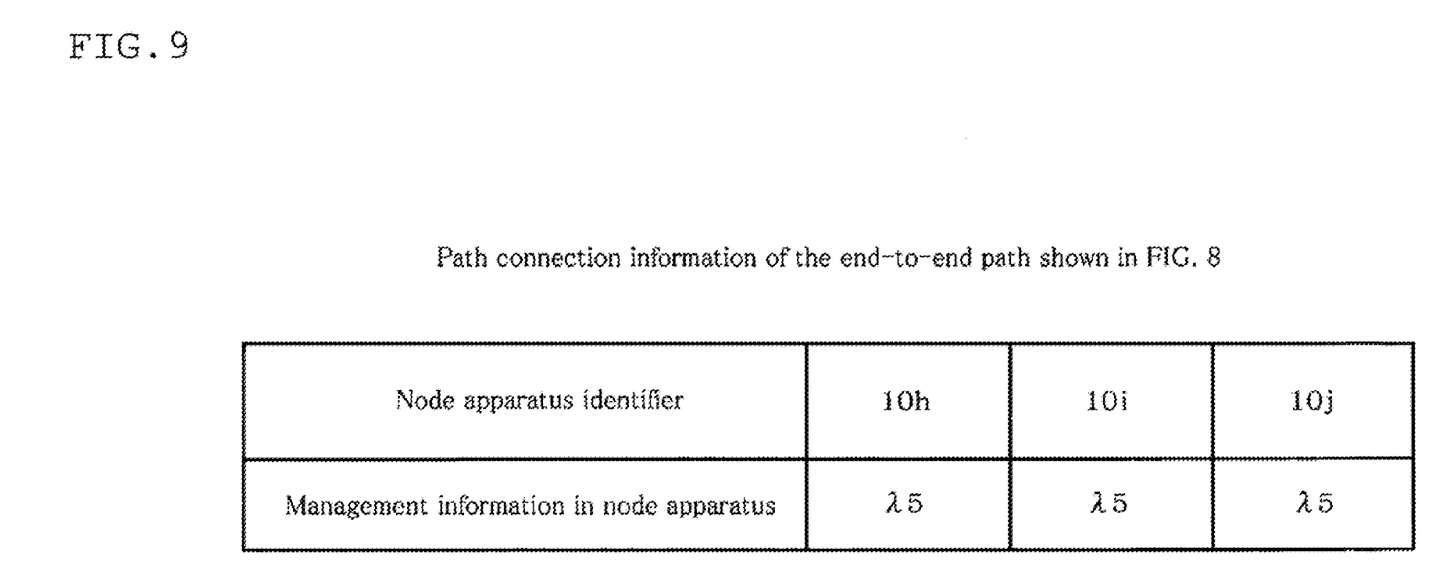
FIG. 9 is a data table showing the path connection information of the end-to-end path shown in FIG. 8.

FIG. 9 is a data table showing the path connection information of the end-to-end path shown in FIG. 8.

As shown in these figures, a path with a route of a node apparatus 10h→node apparatus 10i→node apparatus 10j is assumed to be set based on a light path of a single wavelength of λ5.

Here, the path setting data of the NMS is assumed to have been disappeared because of an illegal access or the like, and the path which has been set in each node apparatus is assumed to have extinguished.

In this case, an NMS terminal 20, after system initialization, makes an access to the node apparatus 10h and can recognize an output having a wavelength λ5. The NMS terminal 20 can recognize that a WDM signal with a wavelength of λ5 is outputted to the node apparatus 10i.

Subsequently, the NMS terminal 20 can recognize an output having a wavelength λ5 in the node apparatus 10i. The NMS terminal 20 can recognize that a WDM signal with a wavelength of λ5 is outputted to the node apparatus 10j.

The NMS terminal 20 can recognize that the node apparatus 10j is the end point of the path, since it cannot recognize the output with a wavelength λ5 in the node apparatus 10j.

From the above, it can be understood that the NMS terminal 20 can generate path setting data with a single wavelength (λ5) with the node apparatus 10h as the starting point, via the node apparatus 10i, and the node apparatus 10j as the end point. In this way, the original end-to-end path can be restored.

Next, an explanation will be made on a WDM network formed of a plurality of light paths with reference to FIG. 10 and FIG. 11.

Figure 10:
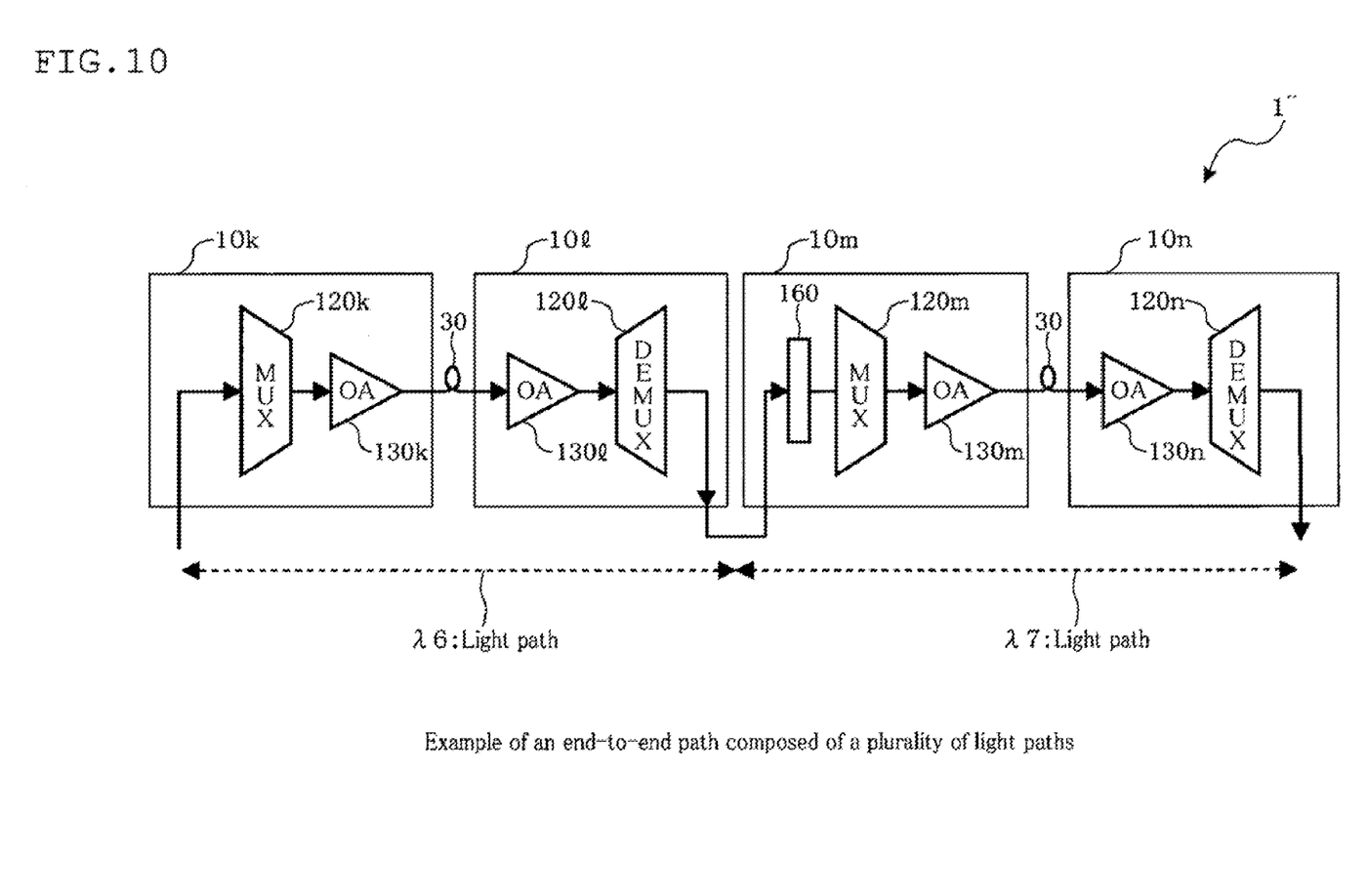
FIG. 10 is a network configuration diagram showing an example of an end-to-end path composed of a plurality of light paths.

FIG. 10 is a network configuration diagram showing an example of an end-to-end path network composed of a plurality of light paths in a WDM network having an NMS.

Figure 11:
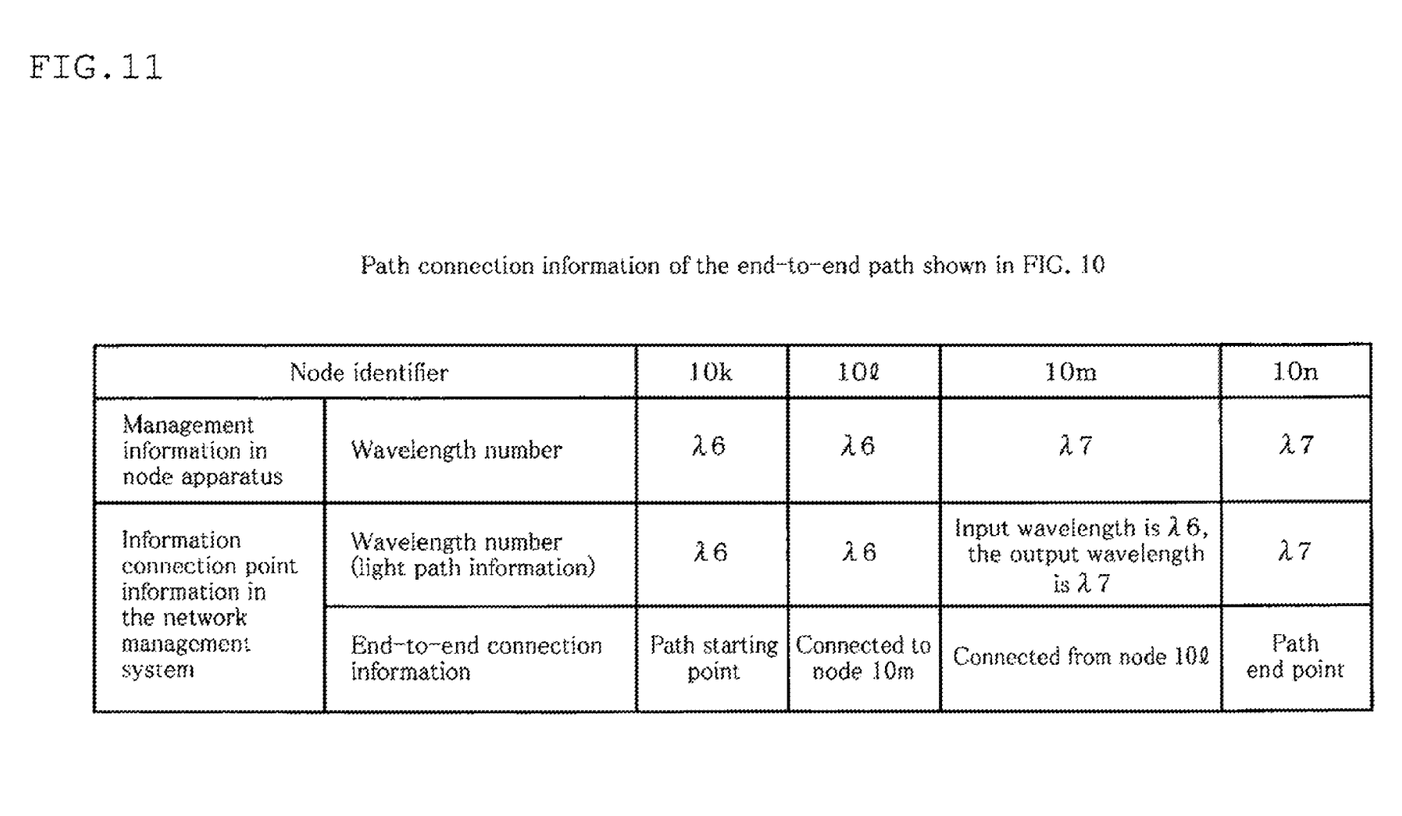
FIG. 11 is a data table showing the path connection information of the end-to-end path shown in FIG. 10.

FIG. 11 is a data table showing the path connection information of the end-to-end path shown in FIG. 10.

Specifically, as shown in FIG. 11, for example, a series of optical transmission path is assumed to be set by a light path between a node apparatus 10k and a node apparatus 10l (wavelength: λ6), wavelength conversion in a node apparatus 10m and a light path (wavelength: λ7) between a node apparatus 10m and a node apparatus 10n.

Here, the path setting data of the NMS is assumed to have been disappeared as in the case mentioned above, and the path which has been set in each node apparatus is assumed to have extinguished.

In this case, the NMS terminal 20, after system initialization, makes an access to a node apparatus 10k and can recognize an output with a wavelength λ6. The NMS terminal 20 can recognize that a WDM signal with a wavelength of λ6 is outputted to the node apparatus 10l.

The NMS terminal 20 may erroneously recognize that the node apparatus 10l is the end point of the path, since it cannot recognize an output with a wavelength λ6 in the node apparatus 10l.

That is, while the original path can be restored in the case where the path is set with a single light path as shown in FIG. 8 and FIG. 9, the original path cannot be restored easily when the path setting data of an NMS disappears in the case where a path is set by a plurality of light paths.

That is, according to the configuration of a path constituting the WDM network, a large amount of time is required for restoring the network, thereby causing extensive and enormous damage or influence.

Patent Document 1 discloses a wavelength path communication network in which each node apparatus calculates and sets a wavelength path based on the use situation of a link connected to its own node as well as on the use situation of a link observed in other nodes.

Patent Document 2 discloses an optical wavelength path setting method in which a sending node sends a receiving node one or more recommended wavelength path information based on the resource use conditions of the receiving node and a relay node, and subsequently, the receiving node selects available recommended wavelength path, sets a resource used in the recommended wavelength path in own node, sends a selected path notification to the relay node and the sending node, and in the sending node and the relay node, sets a resource relating to the received selected path notification in self node.

That is, Patent Documents 1 and 2 propose a technology in which each node sets a wavelength path without using an NMS.

Patent Document 1: JP-A-2003-235061
Patent Document 2: JP-A-2003-234771

SUMMARY

However, in the technologies disclosed in the above-mentioned Patent Document 1 or Patent Document 2, an NMS is not necessarily required. The following adverse effects are considered to be brought about by highly functional nodes.

For example, according to the technology disclosed in Patent Document 1 or Patent Document 2, each node sets up a circuit autonomously. Therefore, a burden on a memory or a processor inevitably increases, resulting in deteriorated performance in original communication processing.

Even if a high-speed processor or a large-volume memory is incorporated in order to avoid deterioration in performance, it causes an increase in cost.

In addition, since each node sets a path after conducting necessary data transmission with other nodes, when the number of nodes is large, a waiting time before starting the service is significantly prolonged, causing difficulty in coping with emergency problems.

The object of the present invention is to provide a communication network management system, a wavelength-division multiplex apparatus, a communication management apparatus, a communication network management method and a communication network management program which enable path restoration quickly without the above-mentioned problems associated with the WDM network, specifically, a huge burden and a high cost.

In order to attain the above-mentioned object, the communication network management system of the present invention is a communication network management system provided with two or more node apparatuses which transmits an optical wave for different wavelengths and a communication management apparatus which sets prescribed path setting data for each of said node apparatuses for forming a transmission path for said optical wave; wherein each node apparatus comprises: a wavelength detecting part which detects the wavelength of an optical wave which is transmitted through a transmission path formed such that it includes the node apparatus; a destination node detecting part which detects a node apparatus connected to said transmission path; a connection information storage part which stores prescribed connection information indicating said wavelength and said node apparatus; a connection information sending part which sends said connection information to said communication management apparatus; and a path setting part which sets a transmission path based on path setting data received from said communication management apparatus, said communication management apparatus comprises: a connection information receiving part which receives said connection information from each node apparatus; a path setting data generating part which generates predetermined path setting data relating to a node apparatus based on said received connection information; and a path setting data sending part which sends said generated path setting data to said node apparatus.

The wavelength-division multiplex apparatus of the present invention is a wavelength-division multiplex apparatus which comprises: a wavelength detecting part which detects the wavelength of an optical wave which is transmitted through a transmission path formed such that it includes said apparatus; a destination node detecting part which detects a wavelength-division multiplex apparatus connected to said transmission path; a connection information storage part which stores prescribed connection information indicating said wavelength and said wavelength-division multiplex apparatus; and a path setting part which sets a transmission path based on path setting data generated by a prescribed communication management apparatus based on said connection information.

The communication management apparatus of the present invention is a connection information receiving means which receives prescribed connection information indicating the wavelength of an optical wave which is transmitted through a transmission path formed such that it includes a prescribed node apparatus and a node apparatus connected to said transmission path; a path setting data generating means which generates prescribed path setting data relating to a node apparatus based on said received connection information; and a means which sets a transmission path in said node apparatus based on said generated path setting data.

The communication network management method of the present invention is a communication network management method which comprises: a first step of detecting the wavelength of an optical wave transmitted through a transmission path formed such that it includes a prescribed node apparatus; a second step of detecting a node apparatus connected to said transmission path; a third step of storing prescribed connection information indicating said wavelength and said node apparatus; and a fourth step of generating path setting data in a prescribed communication management apparatus based on said connection information; and a fifth step of setting a transmission path based on path setting data received from said communication management apparatus.

A communication network management program which allows a prescribed computer which manages a node apparatus which transmits an optical wave for different wavelengths to function as: a means for detecting the wavelength of an optical wave transmitted through a transmission path formed such that it includes said node apparatus; a means for detecting a node apparatus connected to said transmission path; a means for storing prescribed connection information indicating said wavelength and said node apparatus; a means for generating path setting data in a prescribed communication management apparatus based on said connection information; and a means for setting a transmission path based on path setting data generated by said communication management apparatus.

EXEMPLARY EMBODIMENT

Exemplary embodiments of the present invention will be explained below with reference to the drawings.

Here, the communication network management system of this exemplary embodiment explained below is realized by a processing, means and functions which are implemented by a computer according to instructions of a program (software). A communication network management program sends instructions to each component of a computer, and allows the computer to perform the following prescribed processing and functions. That is, each means in the communication network management system, the wavelength-division multiplex apparatus, the communication management apparatus and the communication network management method in this exemplary embodiment is realized by specific means attained by the co-operation of the communication network management program and a computer.

Meanwhile, all or part of the program is provided by an arbitral computer-readable storage medium such as a magnetic disk, an optical disk and a semiconductor memory. The program which has been read out from a storage medium is then installed on a computer for implementation. The program can be directly loaded on a computer through a communication network without using a storage medium.

First Exemplary Embodiment

Firstly, the communication network management system according to a first exemplary embodiment of the present invention will be explained with reference to FIGS. 1 to 5.

Figure 1:
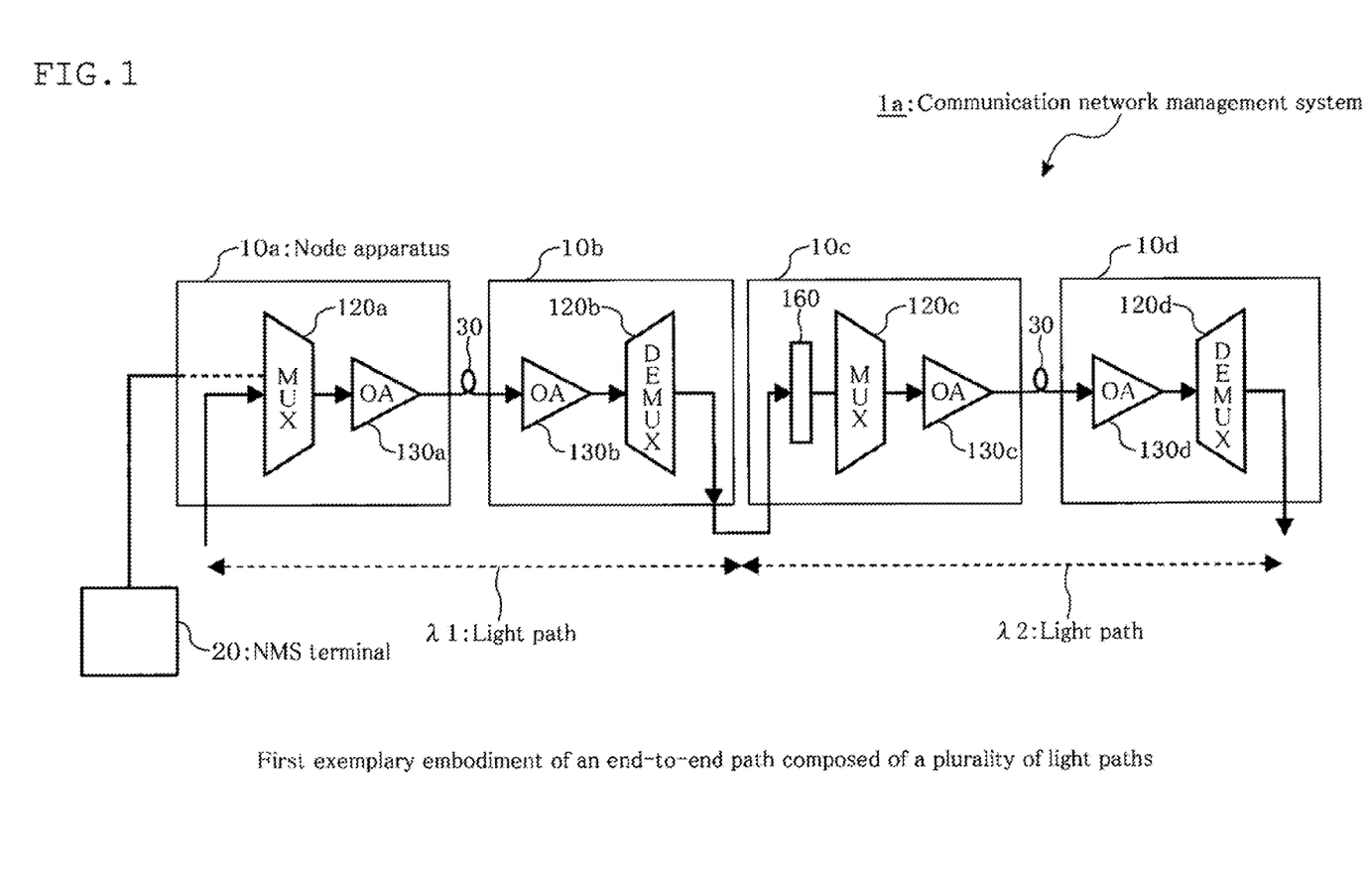
FIG. 1 shows a network configuration diagram showing the communication network management system according to the first exemplary embodiment of the present invention.

FIG. 1 is a network configuration diagram showing the configuration of the communication network management system according to the first exemplary embodiment of the present invention.

As shown in FIG. 1, a communication network management system 1*a* according to this exemplary embodiment is a WDM network management system composed of a plurality of node apparatuses 10 (10*a* to 10*d*) and an optical link 30, and is capable of managing unitarily the entire WDM network by connecting a NMS terminal 20 to the node apparatus 10*a*.

As shown in FIG. 1, wavelength conversion is conducted at a node apparatus 10*c* since a series of optical transmission path in which a plurality of light paths are serially connected are required to be formed.

Here, the configuration of the node apparatus 10 and the NMS terminal 20 will be explained with reference to FIGS. 2 and 3.

(Node Apparatus 10)

Figure 2:
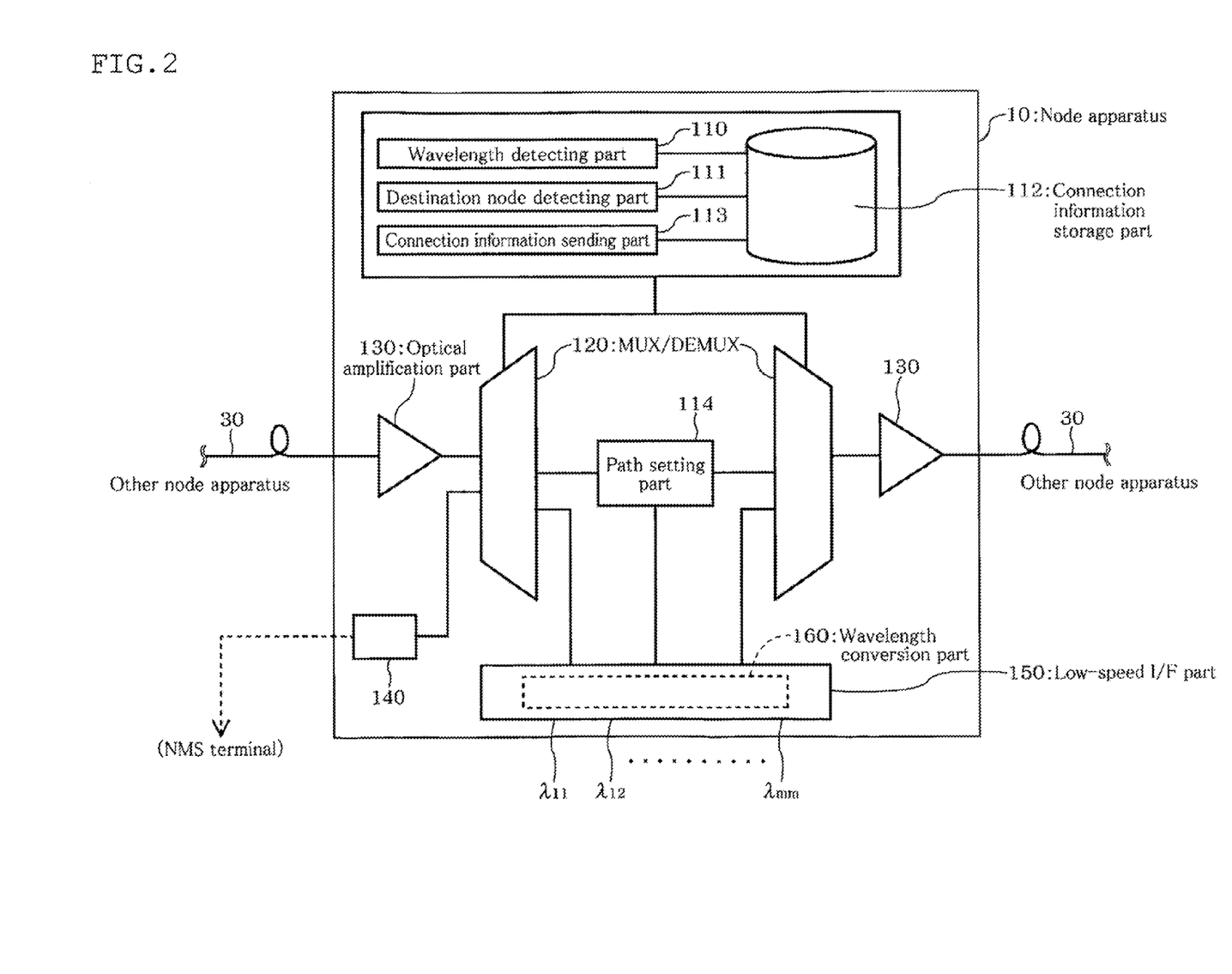
FIG. 2 shows a block diagram showing the configuration of the node apparatus according to the first exemplary embodiment of the present invention.

FIG. 2 is a block diagram showing the configuration of the node apparatus 10 according to this exemplary embodiment.

As shown in FIG. 2, the node apparatus 10 according to this exemplary embodiment is a WDM apparatus for forming a WDM network. Nodes apparatuses are connected through an optical amplification part 130 and an optical link 30.

A MUX/DEMUX part 120 conducts wavelength multiplex or division by using a wavelength multiplexer such as an optical coupler and an optical splitter.

Specifically, the MUX/DEMUX part 120 is optically connected to the optical amplification part 130. The MUX/DEMUX part 120 divides an optical signal received from the optical amplification part 130 for a plurality of wavelengths, and sends the thus divided signal to a low-speed I/F part 150.

The MUX/DEMUX part 120 wavelength-division-multiplexes a plurality of light paths received from the low-speed I/F part 150, and an optical signal which has been amplified by the optical amplification part 130 is outputted to other node apparatus 10.

In addition, the low-speed I/F part 150 is provided with a wavelength conversion part 160, and the low-speed I/F part 150 can optically connect a plurality of paths differing in wavelength by the wavelength conversion.

Further, the node apparatus 10 is provided with an NMS I/F part 140 and has a configuration that it is connected with the NMS terminal 20 through a LAN cable or the like.

A path setting part 114 sets a path (light path) in the node apparatus 10 in response to a request from the NMS terminal 20.

In addition to the above-mentioned configuration, the node apparatus 10 according to this exemplary embodiment is provided with a wavelength detecting part 110, a connection node detecting part 111, a connection information storage part 112 and a connection information sending part 113.

The wavelength detecting part 110 detects the wavelength of a path which is currently set in its own node apparatus 10.

As for the information on the "wavelength", any information is possible as long as it can recognize the difference or similarity in wavelength. For example, identification data such as a wavelength number is desirable.

In addition, as the wavelength information, the wavelength detecting part 110 detects the wavelength of a path on the output side and the wavelength of a path on the input side.

As mentioned above, the low-speed I/F part 150 is provided with the wavelength conversion part 160.

Therefore, in the case where wavelength conversion is conducted for an output path, the wavelength detecting part 110 detects a wavelength after the conversion as the wavelength of an path on the output side, and in the case where wavelength conversion is conducted for an input path, the wavelength detecting part 110 detects a wavelength before the conversion as the wavelength of a path on the input side.

A destination node detecting part 111 detects a node apparatus to which an optical wave path currently set in self node apparatus is connected.

For example, in the node apparatus 10*b* in FIG. 1, the destination node detecting part 111 extracts information on the node apparatus 10*c*.

The connection information storage part 112 stores connection information composed of a wavelength detected by the wavelength detecting part 110 and a destination node apparatus detected by the destination node detecting part 111, and construct a data base required for path setting.

Figure 4:
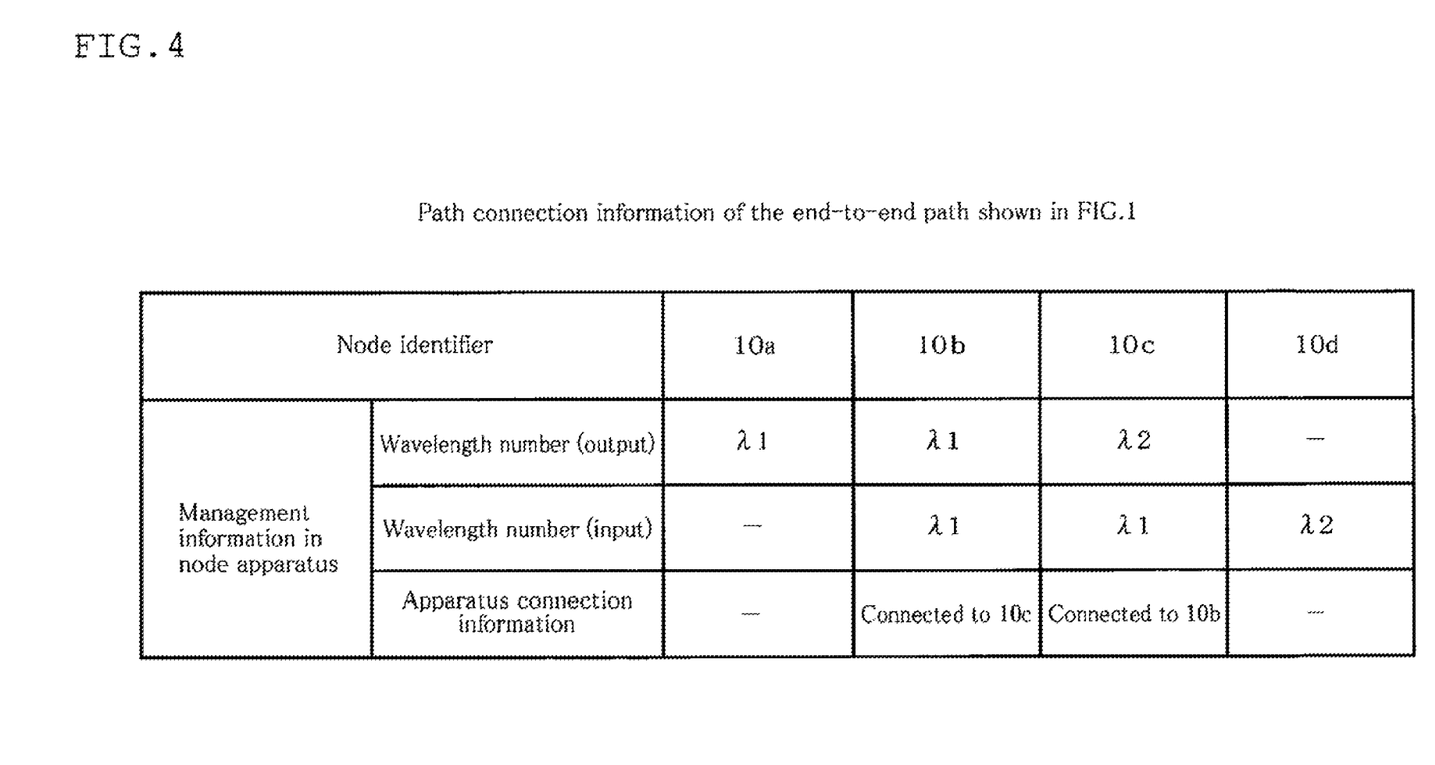
FIG. 4 is a data table showing the path connection information of the end-to-end path shown in FIG. 1.

Specifically, as shown in FIG. 4, the connection information storage part 112 stores an output wavelength, an input wavelength and a destination node apparatus for each node apparatus in a correspondence manner.

A connection information sending part 113 sends connection information stored in the connection information storage part 112 to the NMS terminal 20.

The timing of sending can be arbitrarily set. For example, connection information may be sent in response to a request by a prescribed operation at the NMS terminal 20.

In addition, when the node apparatus 10 is provided with a fault detection sensor, connection information may be sent according to fault detection.

(NMS Terminal 20)

Figure 3:
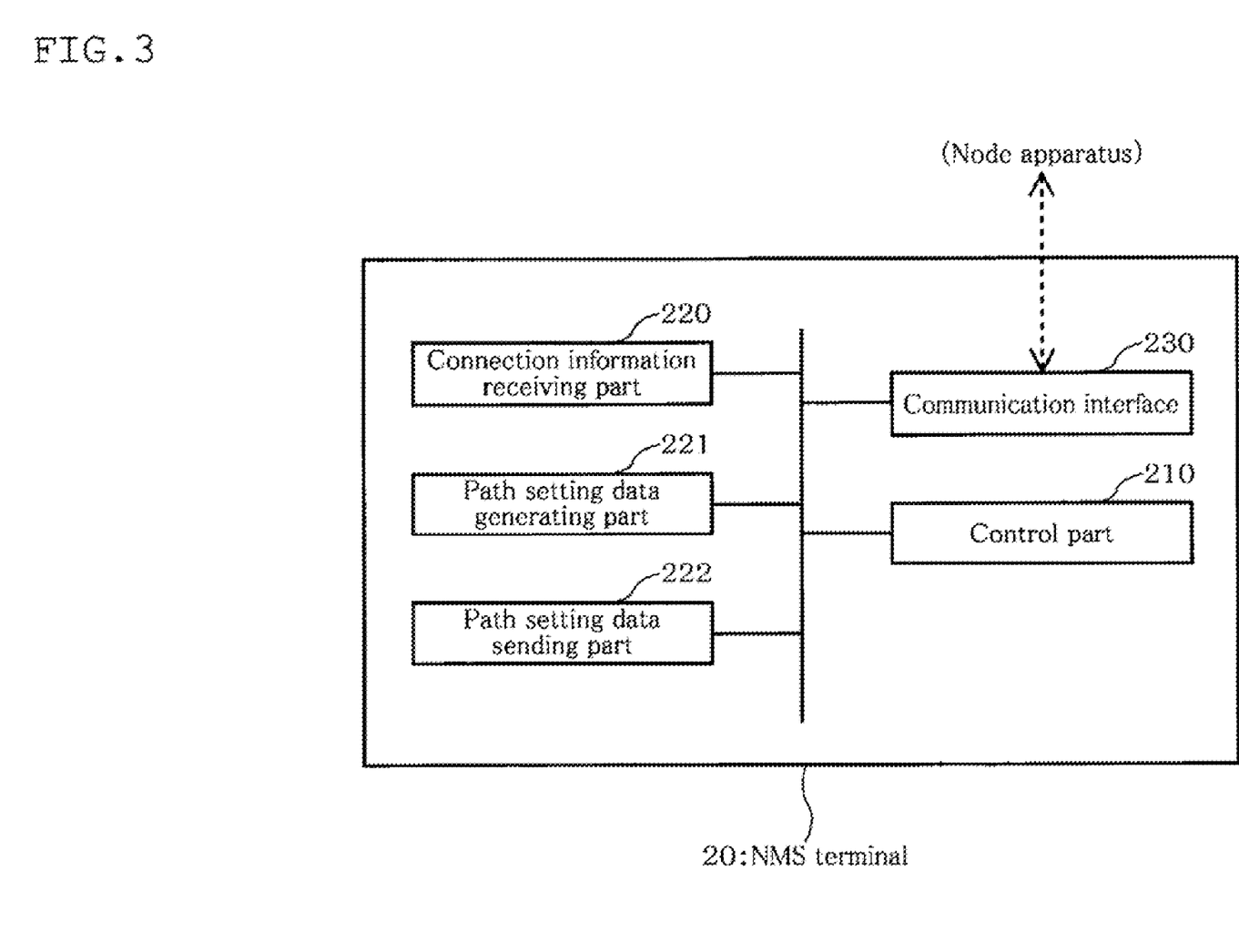
FIG. 3 is a block diagram showing the configuration of the NMS terminal according to the first exemplary embodiment of the present invention.

FIG. 3 is a block diagram showing the configuration of the NMS terminal according to this exemplary embodiment.

The NMS terminal 20 is an information processing terminal such as a work station, and is provided with, although not shown, an inputting part such as a key board and a mouse, a display part such as a display, a storage part for storing path setting data or the like, and performs monitoring or analysis of the state of the WDM network.

In addition to these functions, the NMS terminal 20 according to this exemplary embodiment can conduct path setting through data transmission with each node apparatus 10.

Therefore, the NMS terminal 20 is characterized in that it can conduct path setting even though it does not have path setting data of each node apparatus.

A control part 210 is composed of CPU (Central Processing Unit) or ROM (Read Only Memory), and controls comprehensively each component of the NMS terminal 20.

Specifically, it issues instructions to each component, mentioned later, by implementing various programs stored in ROM (including the communication network management program of the present invention).

A connection information receiving part 220 receives connection information relating to light path from each node apparatus 10 through a communication interface 230.

The received connection information is stored in a memory such as a RAM or in a prescribed storage area of a hard disc, and is utilized when generating path setting data.

A path setting generating part 221 generates path setting data relating to a node apparatus based on connection information received by the connection information receiving part 220.

For example, when the end-to-end path shown in FIG. 1 is reproduced, it generates path setting data based on connection information shown in FIG. 4 according to the following rule.

(1) Node Apparatus 10$a$

As shown in FIG. 4, since the NMS terminal 20 cannot detect a wavelength number on the input side, it recognizes that the node apparatus 10$a$ is a starting point of a path. The NMS terminal 20 can recognize an output path having a wavelength number $\lambda 1$. In addition, as shown in FIG. 4, although apparatus connection information indicating a destination node cannot be detected, the NMS terminal can recognize that a node on the output side is 10$b$ based on the output path with a wavelength number $\lambda 1$. Accordingly, the path setting data 221 generates the "path setting data ($\lambda 1$) for the node apparatus 10$b$ with the node apparatus 10$a$ as the starting point".

(2) Node Apparatus 10$b$

In the same way, since the NMS terminal 20 can detect a wavelength number $\lambda 1$ on the input side and a wavelength number $\lambda 1$ on the output side, it recognizes that the node apparatus 10$b$ is a relay node. That is, for the node apparatus 10$b$, it is necessary to set a path on the input side and a path on the output side.

In addition, since the wavelength number $\lambda 1$ is the same as the wavelength number on the output side of the node apparatus 10$a$, the path setting data generating part 221 generates the "path setting data ($\lambda 1$) for the node apparatus 10$a$" as the path on the input side.

On the other hand, as shown in FIG. 4, the node apparatus 10$c$ is set as the apparatus connection information regarding the node apparatus 10$b$. Therefore, the path setting data generating part 221 generates the "path setting data ($\lambda 1$) for the node apparatus 10$c$".

(3) Node Apparatus 10$c$

In the same way, since the NMS terminal 20 can detect a wavelength number $\lambda 1$ on the input side and a wavelength number $\lambda 2$ on the output side, it recognizes that the node apparatus 10$c$ is a relay node.

In addition, since the node apparatus 10$b$ is set as the apparatus connection information in correspondence with the wavelength number $\lambda 1$ on the input side, the path setting data generating part 221 generates the "path setting data ($\lambda 1$) for the node apparatus 10$b$" as the path on the input side.

On the other hand, since a node apparatus on the output side can be recognized as 10$d$ based on the path with an output wavelength $\lambda 2$, the path setting data generating part 221 generates the "path setting data ($\lambda 2$) for the node apparatus 10$d$" as the path on the output side.

(4) Node Apparatus 10$d$

In the same way, since the NMS terminal 20 cannot detect a wavelength number on the output side, it recognizes that the node apparatus 10$d$ is an end point.

On the other hand, the NMS terminal can detect a wavelength number $\lambda 2$ on the input side. As shown in FIG. 4, the wavelength number $\lambda 2$ coincides with the wavelength number on the output side of the node apparatus 10$c$, the path setting data generating part 221 generates the "path setting data ($\lambda 2$) for the node apparatus 10$c$" as the path on the input side.

A path setting data sending part 222 shown in FIG. 3 sends path setting data generated by the path setting data generating part 221 to the node apparatus 10.

The path setting data which has been sent is received through a NMS I/F part 140 of the node apparatus 10, and a light path is set by a path setting part 114.

As a result, the original end-to-end path shown in FIG. 1 is restored.

Next, an explanation is made on a communication network management method according to this exemplary embodiment will be explained with reference to the drawings.

Figure 5:
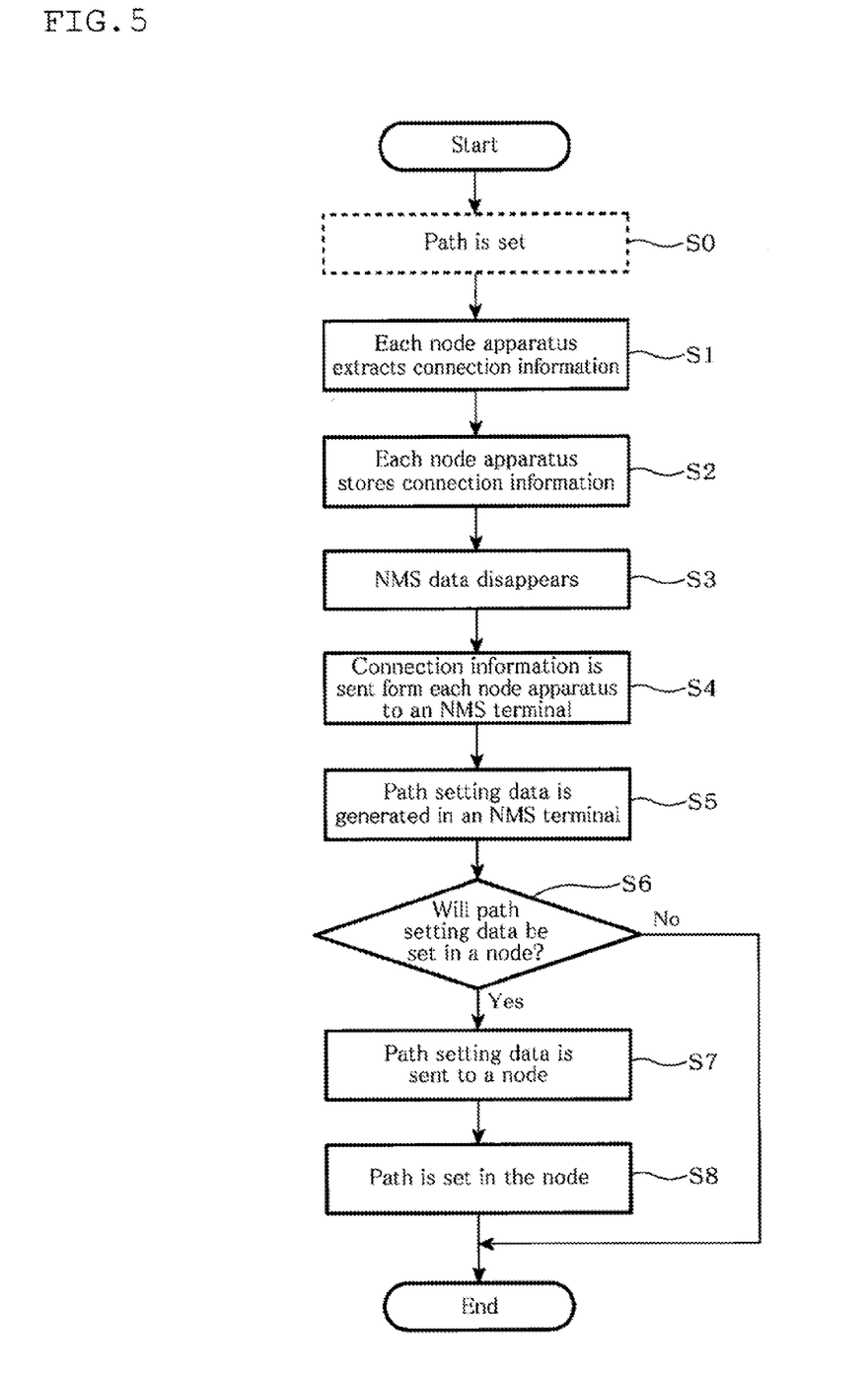
FIG. 5 is a flow chart showing the procedure of the communication network management method according to the first exemplary embodiment of the present invention.

FIG. 5 is a flow chart showing the procedure of the communication network management method according to this exemplary embodiment.

As shown in FIG. 5, in the communication network management method according to this exemplary embodiment, an assumption is made that an end-to-end path has been set as shown in FIG. 1 (S0).

The NMS terminal 20 is assumed to have unitarily path setting data relating to this end-to-end path.

Based on these assumptions, the node apparatus 10 according to this exemplary embodiment extracts connection information relating to light path which has been set in itself (S1).

Specifically, the wavelength detecting part 110 detects the wavelength of the path, and the connection node detecting part 111 detects a path destination node apparatus.

Next, in each node apparatus 10, the connection information storage part 112 stores connection information which has been detected in Step S1 (S2).

Here, an assumption is made that the path setting data owned by the NMS terminal 20 has disappeared for some reasons (S3).

Subsequent to Step S3, the connection information sending part 113 of each node apparatus 10 sends connection information which has been stored in Step S2 to the NMS terminal 20 (S4).

For example, in response to the request from the NMS 20, connection information in each node apparatus 10 (wavelength information and apparatus connection information) is sent to the NMS terminal 20.

Then, in the NMS terminal 20, the connection information receiving part 220 receives connection information from each node apparatus 10, and the path setting data generating part 221 generates the original path setting data based on this connection information (S5).

By storing the data generated by Step S5 in a hard disc or the like, restoration of the path setting data which has been disappeared from the NMS terminal is completed.

Then, based on the path setting data generated in Step S5, judgment is conducted on whether path setting is conducted or not (S6).

This is based on an assumption that path itself disappears simultaneously with the disappearance of the NMS data.

For example, this is based on an assumption that the system of the entire WDM network is down due to a disaster or an illegal access. In this case, path re-setting is continued, whereby the end-to-end path is quickly restored.

In Step S6, when a path is set in the node apparatus 10 (S6: YES), in the NMS terminal 20, the path setting data sending part 222 sends path setting data to each node apparatus 10 (S7).

In the node apparatus 10, the path setting part 114 implements path setting based on the path setting data (S8), whereby a series of processing of this communication network management method is completed.

As a result, the WDM network which encounters system down or the like is quickly restored.

Meanwhile, in Step S6, the processing of this communication network management is completed even if a path is not set in the node apparatus 10 (S6: NO).

As mentioned above, in the communication network management system 1a of this exemplary embodiment, each node apparatus 10 owns connection information relating to the path which has been set in itself.

In the case where the NMS terminal 20 loses path setting data or the like, this communication information is sent to the NMS terminal according to need.

Therefore, data necessary for path setting can be restored easily and quickly irrespective of being a single wavelength or a multiple wavelength.

In addition, a path can be set quickly, whereby a NDM network can be restored smoothly.

Further, if any trouble occurs in NMS, and reliability of the path setting data owned by NMS cannot be maintained, the data can be reset to correct path setting data.

Therefore, according to this exemplary embodiment, the communication network management system for the WDM network, which is excellent in reliability and convenience, can be realized and proposed reasonably.

Second Exemplary Embodiment

Then, a communication network management system 1b according to a second exemplary embodiment of the present invention will be explained with reference to the drawing.

Figure 6:
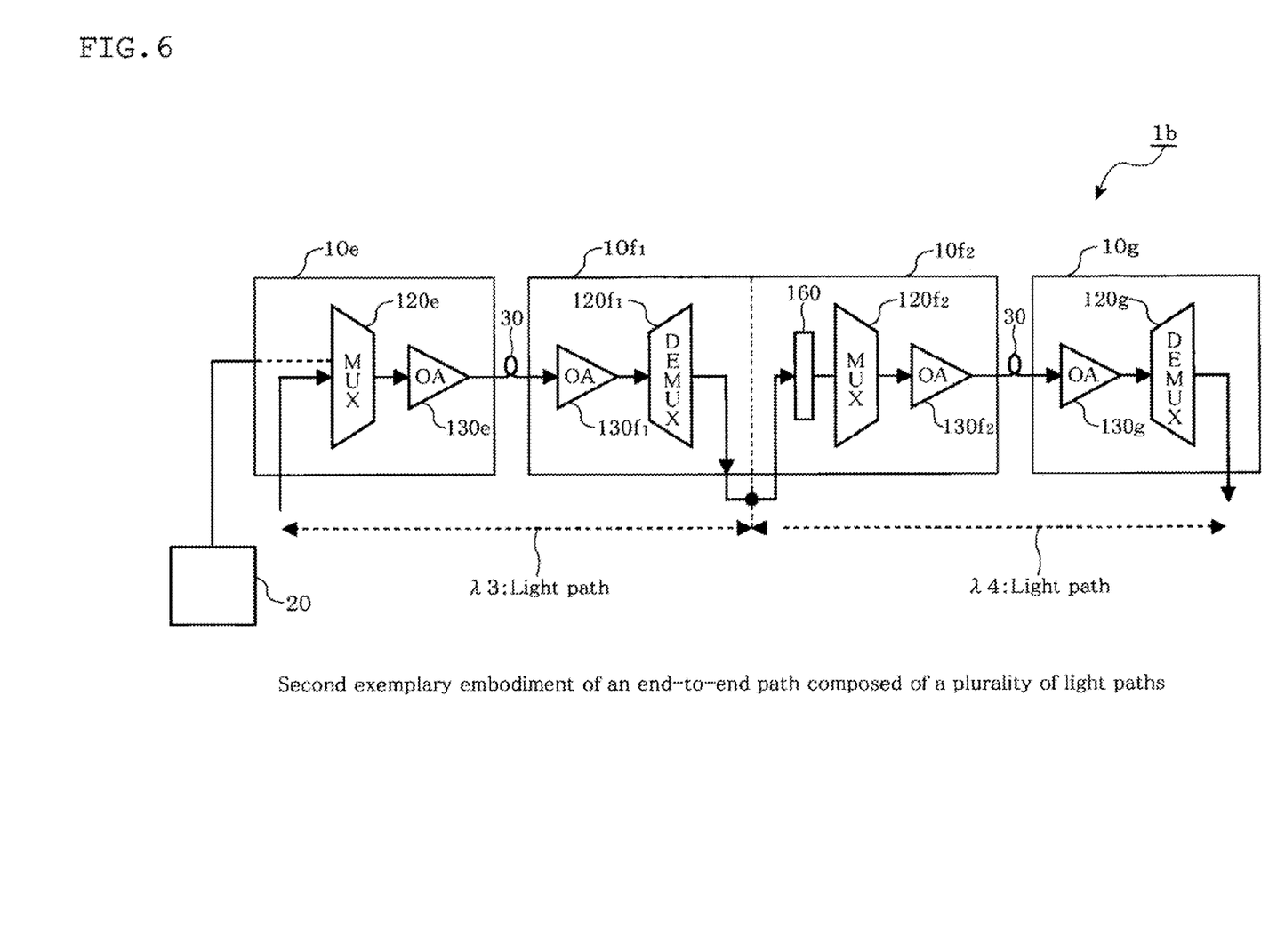
FIG. 6 is a network configuration diagram showing the configuration of the communication network management system according to the second exemplary embodiment of the present invention.

FIG. 6 is a network configuration diagram showing the configuration of the communication network management system according to the second exemplary embodiment of the present invention.

The communication network management system 1b of this exemplary embodiment is composed of the node apparatus 10 and the NMS terminal 20 as in the case of the first exemplary embodiment. The configuration of each apparatus is also the same.

However, the communication network system 1b according to this exemplary embodiment differs from that in the first exemplary embodiment in that a plurality of paths differing in wavelength are present in a relay node apparatus 10f.

Specifically, as shown in a node apparatus 10f shown in FIG. 6, an optical wave from the node apparatus 10e (wavelength number $\lambda 3$) is wavelength-converted into another optical wave (wavelength number $\lambda 4$) by the wavelength conversion part 160 belonging to the $10_{f2}$ side of a node apparatus 10f, and the converted optical wave is then outputted to a node apparatus 10g.

Then, the rule of the path setting data generation in this exemplary embodiment will be explained with reference to FIG. 7.

Figure 7:
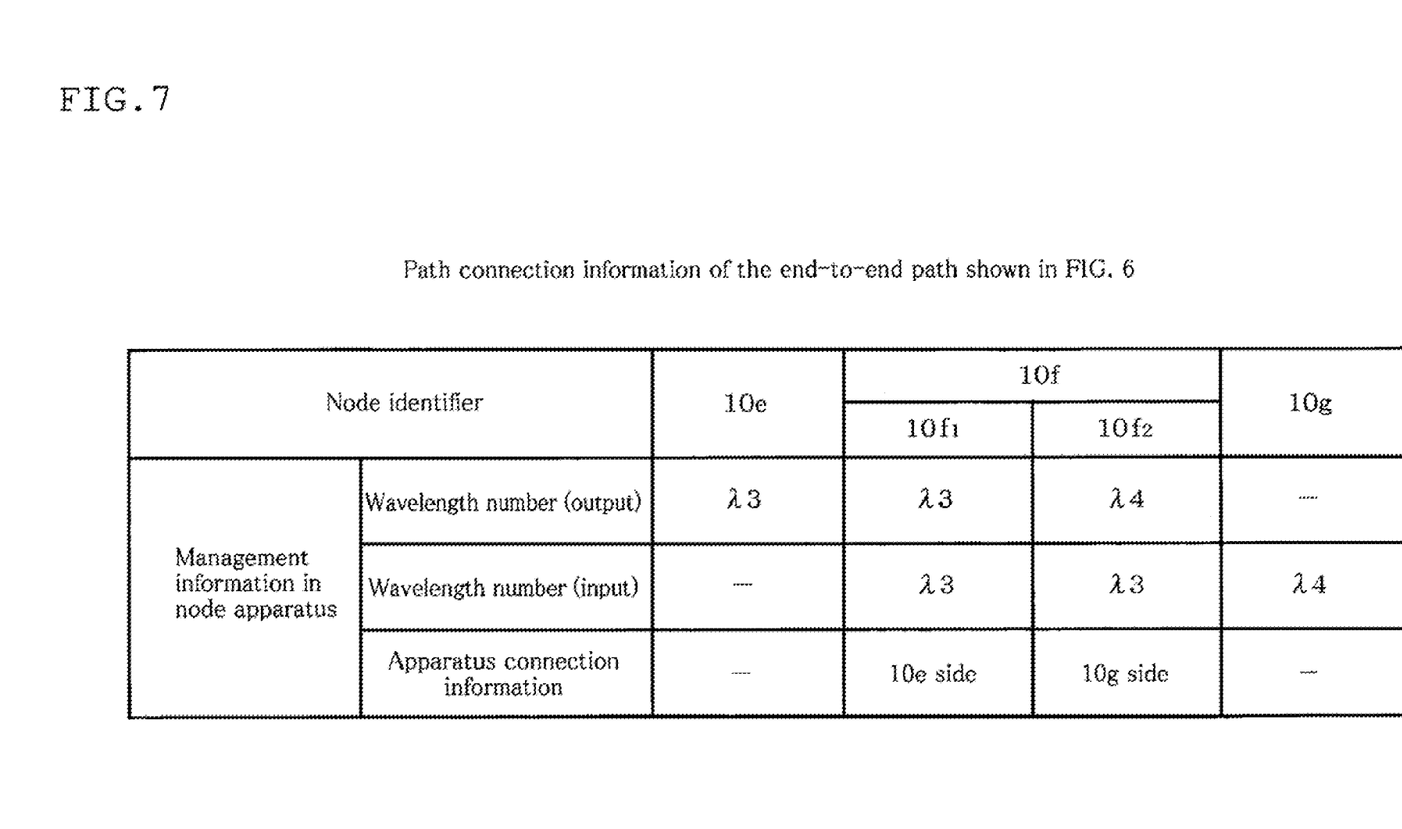
FIG. 7 is a data table showing the path connection information of the end-to-end path shown in FIG. 6.

FIG. 7 is a table showing the path connection information of each node apparatus in the second exemplary embodiment of the present invention.

(1) Node Apparatus 10e

As shown in FIG. 7, the NMS terminal 20 cannot detect a wavelength number on the input side. Therefore, the NMS terminal 20 can recognize that the node apparatus 10e is the starting point of a path. The NMS terminal 20 can recognize an output path with a wavelength number of $\lambda 3$. In addition, as shown in FIG. 7, although apparatus connection information indicating a destination node cannot be detected, it can recognize that the node on the output side is 10f based on the output path with a wavelength number of $\lambda 3$, whereby the path setting data generating part 221 generates the "path setting data ($\lambda 3$) for the node apparatus 10f with the node apparatus 10e as the starting point".

(2) Node Apparatus 10f

The NMS terminal 20 can detect two sets of connection information. Specifically, as the first set of connection information, the wavelength number $\lambda 3$ on the input side and the wavelength number $\lambda 3$ on the output side can be detected. Further, as the second set of connection information, the wavelength number $\lambda 3$ on the input side and the wavelength number $\lambda 4$ on the output side can be detected.

Therefore, the NMS terminal 20 can recognize that the node apparatus 10f is a relay node, and can recognize an input/output path corresponding to the first set of connection information and an input/output path corresponding to the second set of connection information.

In addition, as for the second set of connection information, since the wavelength number $\lambda 3$ on the input side and the wavelength number $\lambda 4$ on the output side differ, it is possible to recognize that wavelength conversion is conducted here.

Therefore, the NMS terminal 20 regards the first set of connection information as the connection information of a virtual node apparatus $10_{f1}$ and regards the second set of connection information as the connection information of a virtual node apparatus $10_{f2}$, path setting data is generated for each of the node apparatus $10_{f1}$ and the apparatus $10_{f2}$.

(2a) Node Apparatus $10_{f1}$

Regarding the connection information of the node apparatus $10_{f1}$, the wavelength λ3 on the input side is the same as the wavelength number on the output side of the node apparatus 10e. In addition, since the node apparatus 10e can be detected as the apparatus connection information, the path setting data generating part 221 generates the "path setting data (λ3) from the node apparatus 10e" as the path on the input side.

On the other hand, as shown in FIG. 7, of the connection information of a node apparatus $10_{f2}$, the wavelength number λ3 on the output side is the same as the wavelength number λ3 on the input side. Therefore, the path setting data generating part 221 generates the "path setting data (λ3) for the node apparatus $10_{f2}$" as the path on the output side.

(2b) Node Apparatus $10_{f2}$

Regarding the node apparatus $10_{f2}$, the wavelength λ3 on the input side is the same as the wavelength number λ3 on the output side of the node apparatus $10_{f1}$. Therefore, the path setting data generating part 221 generates the "path setting data (λ3) from the node apparatus $10_{f1}$" as the path on the input side.

On the other hand, as shown in FIG. 7, from a path with an output wavelength of λ4 and the apparatus connection information, a node apparatus on the output side can be recognized as a node apparatus 10g. Therefore, the path setting data generating part 221 generates the "path setting data (λ4) for the node apparatus 10g" as the path on the output side.

(3) Node Apparatus 10g

In the same way, since the NMS terminal 20 cannot detect the wavelength number on the output side, it recognizes that the node apparatus 10g is an end point.

On the other hand, it can detect the wavelength number λ4 on the input side. As shown in FIG. 7, the wavelength number λ4 coincides with the wavelength number on the output side of the node apparatus $10_{f2}$, the path setting data generating part 221 generates the "path setting data (λ4) from the node apparatus $10f_{12}$" as the path on the input side.

As mentioned above, according to the communication network system 1b of this exemplary embodiment, restoration of a plurality of paths which involve wavelength conversion within the node apparatus 10 can be conducted without problems.

Accordingly, the same actions and advantageous effects can be brought about irrespective of the configuration of a path.

Hereinabove, the communication network management system of the present invention is explained with reference to exemplary embodiments. However, the communication network management system of the present invention is not limited to the above mentioned exemplary embodiments, and it is needless to say various modifications are possible within the scope of the present invention.

For example, the WDM network of the present invention may not be an end-to-end path, and may be of ring type or a combination of an end-to-end path and a ring type path. As a result, it can correspond to networks with various forms.

That is, according to the communication network management system, the wavelength-division multiplex apparatus, the communication management apparatus, the communication network management method and the communication network management program of the present invention, a path can be set quickly and accurately by holding the path setting data in a distributed manner.

Therefore, even though a WDM network encounters a system down or the like, the original network can be restored smoothly.

INDUSTRIAL APPLICABILITY

The present invention can preferably be utilized in an optical network provided with a wavelength-division multiplex apparatus.

The invention claimed is:

1. A communication network management system provided with two or more node apparatuses which transmits an optical wave for different wavelengths and a communication management apparatus which sets prescribed path setting data for each of said node apparatuses for forming a transmission path for said optical wave; wherein each node apparatus comprises:

a wavelength detecting part which detects the wavelength of an optical wave which is transmitted through a transmission path formed such that it includes the node apparatus, and wherein said wavelength detecting part detects an output wavelength and an input wavelength of an optical wave transmitted through a transmission path formed such that it includes the node apparatus;

a destination node detecting part which detects a node apparatus connected to said transmission path;

a connection information storage part which stores prescribed connection information indicating said wavelength and said node apparatus, and wherein said connection information storage part stores prescribed connection information indicating said output wavelength, said input wavelength and said apparatus connected to said transmission path;

a connection information sending part which sends said connection information to said communication management apparatus; and a path setting part which sets a transmission path based on path setting data received from said communication management apparatus, said communication management apparatus comprises:

a connection information receiving part which receives said connection information from each node apparatus;

a path setting data generating part which generates predetermined path setting data relating to a node apparatus based on said received connection information; and a path setting data sending part which sends said generated path setting data to said node apparatus.

2. The communication network management system according to claim 1, wherein, when said connection information regarding a node apparatus received by said connection information receiving part contains only the output wavelength, said path setting data generating part generates said path setting data with said node apparatus being as a starting point.

3. The communication network management system according to claim 1, wherein, when said connection information regarding a node apparatus received by said connection information receiving part contains only the input wavelength, said path setting data generating part generates path setting data with this node apparatus being as an end point.

4. The communication network management system according to claim 1, wherein, when said connection information received regarding a node apparatus received by said connection information receiving part contains both the output wavelength and the input wavelength, said path setting data generating part generates path setting data on the input side and path setting data on the output side with said node apparatus being as a relay.

5. The communication network management system according to claim 1, wherein said path setting data generating part, when said connection information received by said connection information receiving part contains two or more combinations of the output wavelength and the input wavelength, generates path setting data on the assumption that the node apparatus is composed of corresponding two or more node apparatuses.

6. The communication network system according to claim 1, wherein
said node apparatus is provided with a wavelength conversion part which converts an output optical wave or an input optical wave to an optical wave having a wavelength different from the wavelength of said input optical wave or said output optical wave,
said wavelength detecting part, of optical waves transmitted through the transmission path formed such that it includes said node apparatus, when said wavelength conversion part converts an output optical wave, detects a wavelength after the wavelength conversion as an output wavelength, and when said wavelength conversion part converts an input optical wave, detects a wavelength before the wavelength conversion as an input wavelength.

7. A wavelength-division multiplex apparatus which comprises:
a wavelength detecting part which detects the wavelength of an optical wave which is transmitted through a transmission path formed such that it includes said apparatus, and wherein said wavelength detecting part detects an output wavelength and an input wavelength of an optical wave transmitted through a transmission path formed such that it includes said apparatus;
a destination node detecting part which detects a wavelength-division multiplex apparatus connected to said transmission path;
a connection information storage part which stores prescribed connection information indicating said wavelength and said wavelength-division multiplex apparatus, and wherein said connection information storage part stores prescribed connection information indicating said output wavelength, said input wavelength and said wavelength-division multiplex apparatus connected to said transmission path;
a path setting part which sets a transmission path based on path setting data generated by a prescribed communication said management apparatus based on connection information.

8. A communication management apparatus which comprises:
a connection information receiving part which receives prescribed connection information indicating the wavelength of an optical wave transmitted through a transmission path formed such that it includes a prescribed node apparatus and a node apparatus connected to said transmission path, and wherein said connection information receiving part receives from each node apparatus connection information indicating an input wavelength and an output wavelength of an optical wave transmitted through a transmission path formed such that it includes a prescribed node apparatus and a node apparatus connected to said transmission path;

a path setting data generating part which generates prescribed path setting data relating to a node apparatus based on said received connection information; and
a path setting data sending part which sets a transmission path in said node apparatus by sending said generated path setting data to said node apparatus.

9. A communication network management method which comprises:
a first step of detecting the wavelength of an optical wave transmitted through a transmission path formed such that it includes a prescribed node apparatus, said first step further comprising detecting an input wavelength and an output wavelength an optical wave transmitted through a transmission path formed such that it includes a prescribed node apparatus;
a second step of detecting a node apparatus connected to said transmission path;
a third step of storing prescribed connection information indicating said wavelength and said node apparatus, said third step further comprising storing connection information indicating said output wavelength, said input wavelength and a node apparatus connected to said transmission path;
a fourth step of generating path setting data in a prescribed communication management apparatus based on said connection information; and
a fifth step of setting a transmission path based on path setting data received from said communication management apparatus.

10. A communication network management program which allows a prescribed computer which manages a node apparatus which transmits an optical wave for different wavelengths to function as:
a means for detecting the wavelength of an optical wave transmitted through a transmission path formed such that it includes said node apparatus;
a means for detecting a node apparatus connected to said transmission path;
a means for storing prescribed connection information indicating said wavelength and said node apparatus;
a means for generating path setting data in a prescribed communication management apparatus based on said connection information; and
a means for setting a transmission path based on path setting data generated by said communication management apparatus, and
wherein said computer is allowed to function as a means for detecting an input wavelength and an output wavelength of an optical wave transmitted through a transmission path formed such that it includes said node apparatus, and a means for storing connection information indicating said output wavelength, said input wavelength and said node apparatus connected to said transmission path.

11. A communication network management system provided with two or more node apparatuses which transmits optical wave for different wavelengths and a communication management apparatus which sets prescribed path setting data for each of said node apparatuses for forming a transmission path of said optical wave; wherein each node apparatus comprises:
a wavelength detecting means which detects the wavelength of an optical wave which is transmitted through a transmission path formed such that it includes the node apparatus, and wherein said wavelength detecting means detects an output wavelength and an input wavelength of an optical wave transmitted through a transmission path formed such that it includes the node apparatus;
a destination node detecting means which detects a node apparatus connected to said transmission path;
a connection information storage means which stores prescribed connection information indicating said wavelength and said node apparatus, and wherein said connection information storage means stores prescribed connection information indicating said output wavelength, said input wavelength and said apparatus connected to said transmission path;
a connection information sending means which sends said connection information to said communication management apparatus; and
a path setting means which sets a transmission path based on path setting data received from said communication management apparatus, wherein
said communication management apparatus comprises:
a connection information receiving means which receives said connection information from each node apparatus;
a path setting data generating means which generates predetermined path setting data relating to a node apparatus based on said received connection information; and
a path setting data sending means which sends said generated path setting data to said node apparatus.

12. A wavelength-division multiplex apparatus which comprises:
a wavelength detecting means which detects the wavelength of an optical path transmitted through a transmission path formed such that it includes said apparatus, and wherein said wavelength detecting means detects an output wavelength and an input wavelength of an optical wave transmitted through a transmission path formed such that it includes said apparatus;
a destination node detecting means which detects a wavelength-division multiplex apparatus connected to the transmission path;
a connection information storing means which stores prescribed connection information indicating said wavelength and said wavelength-division multiplex apparatus, and wherein said connection information storage means stores prescribed connection information indicating said output wavelength, said input wavelength and said wavelength-division multiplex apparatus connected to said transmission path;
a path setting means which sets a transmission path based on path setting data created by a prescribed communication management apparatus based on said connection information.

13. A communication management apparatus which comprises:
a connection information receiving means which receives prescribed connection information indicating the wavelength of an optical wave which is transmitted through a transmission path formed such that it includes a prescribed node apparatus and a node apparatus connected to said transmission path, and wherein said connection information receiving means receives from each node apparatus connection information indicating an input wavelength and an output wavelength of an optical wave transmitted through a transmission path formed such that it includes a prescribed node apparatus and a node apparatus connected to said transmission path;
a path setting data generating means which generates prescribed path setting data relating to a node apparatus based on said received connection information; and
a means which sets a transmission path in said node apparatus based on said generated path setting data.

* * * * *